United States Patent Office 2,959,575
Patented Nov. 8, 1960

2,959,575
PENTAFLUOROBUTADIENE COPOLYMERS

Elizabeth S. Lo, Fords, N.J., assignor, by mesne assignments, to Minnesota Mining and Manufacturing Company, St. Paul, Minn., a corporation of Delaware No Drawing. Filed Oct. 18, 1956, Ser. No. 616,587

10 Claims. (Cl. 260—87.5)

This invention relates to halogen-containing copolymeric compositions. In one aspect, the invention relates to fluorine-containing copolymeric compositions. More particularly, in this aspect, the invention relates to copolymeric compositions of pentafluorobutadiene and the method for their manufacture.

It is an object of this invention to provide new and useful fluorine-containing copolymeric compositions having desirable chemical and physical characteristics.

Another object of this invention is to provide new and useful copolymeric compositions of pentafluorobutadiene, which possess elastomeric properties, together with good chemical and physical characteristics, and which can be easily fabricated into a wide variety of useful articles of improved chemical and physical stability.

Still another object of this invention is to provide new and useful copolymeric compositions of pentafluorobutadiene which can serve as protective coatings having the aforementioned characteristics, and which can be readily applied to the surface of a wide variety of useful articles.

A still further object of the invention is to provide a process for producing these copolymeric compositions in good yields.

Various other objects and advantages inherent in the invention will become apparent to those skilled in the art from the accompanying description and disclosure.

It has now been found that the copolymerization of pentafluorobutadiene and fluorohalo-monoolefins, under the conditions more fully hereinafter described, produces elastomeric copolymeric compositions possessing good chemical and physical stability, and good resistance to oils, fuels and various strong chemical reagents. These copolymeric products of pentafluorobutadiene and fluorohalo-monoolefins, constitute valuable macro-molecules and are adaptable to a wide variety of commercial uses. They possess low-temperature flexibility in addition to the aforementioned properties and good chemical and physical stability and resistance to oil and hydrocarbon fuels. They are also selectively soluble in various commercial solvents and serve as durable, flexible, protective coatings on surfaces which are subjected to environmental conditions in which they may come into contact with any of the aforementioned corrosive substances.

As indicated above, the pentafluorobutadiene is copolymerized with a fluorohalo-monoolefin. Of the latter, the fluorochloro-monoolefins are preferred, and particularly the fluorochloroethylenes, e.g., trifluorochloroethylene or 1,1-dichloro-2,2-difluoroethylene.

In general, as more fully hereinafter described, the copolymeric compositions of the present invention are produced from the polymerization of monomeric mixtures containing the pentafluorobutadiene and the fluorohalo-monoolefin at temperatures between about —20° C. and about 150° C., with intermediate temperature ranges being selected with reference to the specific polymerization system employed. The most useful elastomeric copolymeric compositions are produced from monomeric mixtures containing between about 5 mole percent and about 95 mole percent of the pentafluorobutadiene and the remaining major constituent being the fluorohalo-monoolefin. The preferred elastomeric copolymeric compositions of the present invention are copolymers produced from monomeric mixtures containing between about 40 mole percent and about 95 mole percent of the pentafluorobutadiene and the remaining major constituent being the fluorohalo-monoolefin.

The copolymeric compositions of the present invention are preferably prepared by carrying out the polymerization reaction in the presence of a free radical-forming promoter. For this purpose, the polymerization reaction is carried out by employing a water-soluble peroxy-type initiator in a water-suspension type recipe or an organic peroxide initiator in a bulk-type system. The water-suspension type recipe is preferred.

The water-suspension type system contains a water-soluble peroxy-type initiator, which is preferably present in the form of an inorganic persulfate such as potassium persulfate, sodium persulfate or ammonium persulfate. In addition, the water-suspension type recipe system may also contain, in some instances, a variable-valence metal salt, for example, an iron salt, such as ferrous sulfate or ferrous nitrate to accelerate the copolymerization reaction. The water-soluble initiator present in the water-suspension type recipe system comprises between about 0.1 and about 5 parts per weight per 100 parts of total monomers present. The variable-valence metal salt is preferably employed in an amount between about 0.01 and about 0.2 parts by weight per 100 parts of total monomers present. It is also desirable, in some instances, in these water-suspension type recipe systems, that a reductant be present, preferably in the form of a bisulfite, such as sodium bisulfite, potassium bisulfite, sodium metabisulfite or potassium metabisulfite. The reductant comprises between about 0.05 and about 5 parts by weight per 100 parts of total monomers present; preferably the reductant comprises between about 0.1 and about 2 parts by weight per 100 parts of total monomers present.

In these water-suspension type recipe systems, it is desirable to employ an emulsifying agent. This emulsifying agent is present either in the form of an aliphatic metal acid-salt having from 14 to 20 carbon atoms per molecule, or in the form of a halogenated-organic acid or salts thereof, having from 6 to 18 carbon atoms per molecule. A typical example of the former is potassium stearate. Typical examples of the halogenated-organic acid or salts thereof, serving as emulsifying agents in the above-mentioned water-suspension type recipe systems, are polyfluorocarboxylic acids (e.g., perfluorooctanoic acid) or perfluorochlorocarboxylic acid salts (e.g. trifluorochloroethylene telomer acid soaps). The polyfluorocarboxylic acids which may be employed are such as those disclosed in U.S. Patent No. 2,559,752; and the non-acidic derivatives of the acids disclosed therein as being effective dispersing agents may also be used in the process of the present invention. The perfluorochlorocarboxylic acid salts which may be used in accordance with this invention are those disclosed in co-pending application Serial No. 501,782, filed April 18, 1955, as being useful dispersing agents in polymerization reactions. In general, these emulsifying agents are present in an amount between about 0.5 and about 10 parts by weight per 100 parts of total monomers present.

The polymerization reaction is preferably conducted under neutral conditions, in order to prevent gelling of the resulting polymeric product, a condition which often causes slow-down or stoppage of the polymerization reaction. In this respect, it should be noted that it is sometimes necessary to maintain the pH of the system at a pH of about 7.0 by the addition of suitable buffer agents. Typical examples are sodium borate and disodium phosphate.

As indicated above, the polymerization reaction may also be carried out with the initiator being present in the form of an organic peroxide in a bulk-type polymerization system. Of these organic peroxide promoters, halogen-substituted peroxides are most desirable. A preferred promoter of this type is trichloroacetyl peroxide. Other halogen-substituted organic peroxides for carrying out the polymerization reaction are trifluorodichloropropionyl peroxide, trifluoroacetyl peroxide, difluoroacetyl peroxide, chloroacetyl peroxide, 2,4-dichlorobenzoyl peroxide, dichlorofluoroacetyl peroxide, benzoyl peroxide and ditertiary butyl peroxide.

As previously indicated, the polymerization reaction is carried out, in general, at a temperature between about $-20°$ C. and about $150°$ C. When the polymerization reaction is carried out employing a water-suspension type recipe, temperatures between about $0°$ C. and about $100°$ C. are preferably employed. When the polymerization reaction is carried out in the presence of an organic peroxide initiator in a bulk-type polymerization system, temperatures over the entire range of between about $-20°$ C. and about $150°$ C. are preferably employed depending upon the decomposition temperature of the promoter. The polymerization reactions described herein to produce the polymeric compositions of the present invention are carried out under autogenous conditions of pressure. These pressures may vary from about atmospheric pressure to as high as 2000 pounds per square inch. However, in general, these pressures do not rise above approximately 500 pounds per square inch.

As previously indicated, the copolymers of the present invention are particularly suitable and useful for the fabrication of a wide variety of materials having highly desirable physical and chemical properties. In this respect, the copolymers of the present invention possess important utility in the fabrication of resilient gaskets, seals, valve-diaphragms, films and various other commercial applications. Another important use of the copolymers of the present invention is in the form of durable, flexible, protective coatings on surfaces which are subjected to distortion in normal uses, e.g., fabric surfaces. For these purposes, the copolymers of the present invention may be dissolved in various commercial solvents. Particularly useful solvents comprise the aliphatic and aromatic esters, ketones and halogenated hydrocarbons. Typical examples of these solvents are diisobutyl ketone, methyl ethyl ketone, methyl isobutyl ketone, ethyl acetate and 1,1,2-trifluorotrichloroethane. In this respect, it should be noted that it is often desirable to regulate the molecular weight of the polymeric compositions of the present invention in order to obtain greater solubility in organic solvents. It is found that the addition of various polymerization modifiers appreciably reduces their solubility, without affecting, unduly, the overall yield. Suitable polymerization modifiers include chloroform ($CHCl_3$), Freon-113 ($CF_2ClCFCl_2$), carbon tetrachloride ($CCl_4$), trichloroacetyl chloride $$(CCl_3COCl)$$

bromotrichloromethane ($CBrCl_3$), dodecyl mercaptan ($C_{12}H_{25}SH$) and mixed tertiary mercaptans. These modifiers are preferably added in amounts between about 0.01 and about 10 parts by weight per 100 parts of total monomers charged to the polymerization reaction. Chloroform is preferred.

The following examples are offered for a better understanding in producing the copolymeric compositions of the present invention and are not to be construed as limiting its scope.

*Example I*

A heavy-walled glass polymerization tube of about 20 ml. capacity is flushed with nitrogen and then charged with 5 cc. of a solution prepared by dissolving 0.1 gram of dodecyl mercaptan and 1 gram of the ammonium salt of perfluorooctanoic acid in 100 cc. of water. The contents of the tube are then frozen, and the tube is next charged with 1 cc. of a promoter solution prepared by dissolving 0.4 gram of sodium metabisulfite and 0.5 gram of borax in 20 cc. of water. The contents of the tube are then refrozen. To the contents of the tube are next charged 4 cc. of a solution prepared by dissolving 1 gram of potassium persulfate in 80 cc. of water. The contents of the tube are then refrozen, and the tube is next connected to a gas-transfer system and evacuated at liquid nitrogen temperature. To the frozen contents of the tube are added, by distillation, 2.77 grams of 1,1,2,4,4-pentafluorobutadiene and 2.23 grams of trifluorochloroethylene, comprising a comonomeric mixture containing 50 mole percent of each monomer. After the contents of the tube are thoroughly frozen with liquid nitrogen, the tube is evacuated and sealed. The 1,1,2,4,4-pentafluorobutadiene is prepared as follows: 1-chloro-1,2-dibromo-1,2,2,-trifluoroethane, $CF_2BrCFClBr$, is added to vinylidene fluoride to yield $$CF_2BrCFClCH_2CF_2Br$$

which is then dehydrobrominated using potassium hydroxide, followed by debromochlorination using zinc to yield $CF_2=CF-CH=CF_2$, B.P. $15.0°$ C.$-15.5°$ C.

The polymerization tube and its contents are next agitated in a temperature-regulated water-bath at $50°$ C. for a period of 24 hours. At the end of this time, the contents of the tube are coagulated by freezing. The coagulated product is then removed from the tube, washed with hot water and then dried to constant weight in vacuo at $35°$ C. A copolymeric product is obtained which is found, upon analysis, to comprise approximately 92 mole percent 1,1,2,4,4-pentafluorobutadiene and the remaining major constituent, trifluorochloroethylene, being present in an amount of approximately 8 mole percent. The copolymer is obtained in an amount corresponding to an 11% conversion.

In a manner similar to that described above, 1,1,2,3,4-pentafluorobutadiene is polymerized with trifluorochloroethylene to produce an elastomeric copolymer of these two monomers.

*Example II*

Employing the procedure set forth in Example I and the same polymerization system, the tube is charged with 2.6 grams of 1,1,2,4,4-pentafluorobutadiene and 2.4 grams of 1,1-dichloro-2,2-difluoroethylene, comprising a comonomeric mixture containing 50 mole percent of each monomer.

The polymerization reaction is carried out at a temperature of $50°$ C. for a period of 40 hours. The resultant elastomeric product is worked up in accordance with the same procedure as set forth in Example I. A rubbery product is obtained and, upon analysis, is found to comprise approximately 86 mole percent 1,1,2,4,4-pentafluorobutadiene and the remaining major constituent, 1,1-dichloro-2,2-difluoroethylene, being present in an amount of approximately 14 mole percent. The copolymer is obtained in an amount corresponding to a 12% conversion.

In a manner similar to that described above, 1,1,2,3,4-pentafluorobutadiene is polymerized with 1,1-dichloro-2,2-difluoroethylene to produce an elastomeric copolymer of these two monomers.

As previously indicated, the copolymeric compositions of the present invention possess highly desirable physical and chemical properties which make them useful for fabrication of a wide variety of thermoplastic articles, or for the application to various surfaces as protective coatings. In such uses, the raw elastomeric copolymer, such as is produced in accordance with the procedure set forth in the above examples, is extruded or pressed into sheets at temperatures between about $200°$ F. and about $650°$ F.

and at a pressure between about 500 and about 15,000 pounds per square inch for a period of about 5 to about 60 minutes. Thereafter, various articles can be molded from preforms cut from sheets and extruded stock in the form of gaskets, diaphragms, packings, etc. In this respect, it is preferred in such applications, that the raw copolymer also includes various vulcanizing agents and fillers.

When employed as protective coatings on any of the surfaces previously described, the raw copolymeric composition is dissolved in any of the aforementioned solvents and is applied to the desired surfaces, employing such apparatus as a knife-spreader or a doctor-blade or a reverse-roll coater. The solvent, after the copolymeric coating composition has been applied to the surface, is permitted to evaporate. This may also be accomplished in the presence of elevated temperatures, if so desired. In many applications, it is desirable to include in the copolymeric coating compositions, various vulcanizing agents. In the latter case, supplementary heat-treatment of the coating is required, either during the solvent-removal step or thereafter. After the solvent has been completely evaporated, the coated surface is ready for use. In this respect, it should be noted that the polymeric coating composition may be applied to the surface either as a single coating, or if so desired, the protective coating may be built-up by the application of several layers, each layer being permitted to harden by solvent evaporation before the next layer is applied. Furthermore, if so desired, the protective coatings, or the polymeric composition, when obtained in the form of sheets, may be suitably pigmented.

Other uses for the copolymeric compositions of the present invention reside in the fabrication of belting hose, mountings, piston and pump-valves, sheet or valve disks, rolls, tubing, pressure-sensitive tape for electrical insulation purposes, grommets, or as adhesives for fastening a rubber surface to a metal or another rubber surface.

Since certain changes may be made in carrying out the process of the present invention in producing the desired copolymeric compositions without departing from the scope of the invention, it is intended that all matter contained in the above description is to be interpreted as illustrative and not in a limiting sense.

I claim:
1. A process which comprises polymerizing a mixture of between 5 and about 95 mol percent of a pentafluorobutadiene selected from the group consisting of 1,1,2,4,4-pentafluorobutadiene and 1,1,2,3,4-pentafluorobutadiene, and between about 95 and about 5 mol percent of a fluorohalomonoolefin selected from the group consisting of trifluorochloroethylene and 1,1-dichloro-2,2-difluoroethylene, in the presence of a free radical forming polymerization promoter at a temperature between about −20° C. and about 150° C.

2. A process which comprises polymerizing a mixture of between about 40 and about 90 mol percent of a pentafluorobutadiene selected from the group consisting of 1,1,2,4,4-pentafluorobutadiene and 1,1,2,3,4-pentafluorobutadiene, and between about 60 and about 10 mol percent of a fluorohalomonoolefin selected from the group consisting of trifluorochloroethylene and 1,1-dichloro-2,2-difluoroethylene, in the presence of a free radical forming polymerization promoter at a temperature between about −20° C. and about 150° C.

3. The process of claim 2 in which the fluorohalomonoolefin is trifluorochloroethylene.

4. The process of claim 2 in which the fluorohalomonoolefin is 1,1-dichloro-2,2-difluoroethylene.

5. A copolymerization product of a monomeric mixture of between about 5 and about 95 mol percent of a pentafluorobutadiene selected from the group consisting of 1,1,2,4,4-pentafluorobutadiene and 1,1,2,3,4-pentafluorobutadiene and between about 95 and about 5 mol percent of a fluorohalomonoolefin selected from the group consisting of trifluorochloroethylene and 1,1,-dichloro-2,2-difluoroethylene.

6. A copolymerization product of a monomeric mixture of between about 40 and about 95 mol percent of a pentafluorobutadiene selected from the group consisting of 1,1,2,4,4-pentafluorobutadiene and 1,1,2,3,4-pentafluorobutadiene and between about 60 and about 5 mol percent of a fluorohalomonoolefin selected from the group consisting of trifluorochloroethylene and 1,1-dichloro-2,2-difluoroethylene.

7. The copolymerization product of claim 6 wherein the fluorohalomonoolefin is trifluorochloroethylene.

8. The copolymerization product of claim 6 wherein the fluorohalomonoolefin is 1,1-dichloro-2,2-difluoroethylene.

9. A copolymerization product having about 92 mol percent of 1,1,2,4,4-pentafluorobutadiene and about 8 mol percent of trifluorochloroethylene.

10. A copolymerization product having about 86 mol percent of 1,1,2,4,4-pentafluorobutadiene and about 14 mol percent of 1,1-dichloro-2,2-difluoroethylene.

References Cited in the file of this patent
UNITED STATES PATENTS

| | | |
|---|---|---|
| 2,647,110 | Wiseman | July 28, 1953 |
| 2,668,182 | Miller | Feb. 2, 1954 |
| 2,716,141 | Miller | Aug. 23, 1955 |
| 2,750,431 | Tarrant et al. | June 12, 1956 |
| 2,793,201 | Gochenour et al. | May 21, 1957 |
| 2,837,503 | Lo | June 3, 1958 |
| 2,842,528 | Herbst et al. | July 8, 1958 |
| 2,843,575 | Hoyt | July 15, 1958 |

OTHER REFERENCES

JACS, vol. 78, p. 59–61, January 5, 1956.